US006871714B2

(12) United States Patent
Johnson

(10) Patent No.: US 6,871,714 B2
(45) Date of Patent: Mar. 29, 2005

(54) HOSPITAL BED POWER-ASSIST

(76) Inventor: Daniel Johnson, 2438 Lafayette Rd., Wayzata, MN (US) 55391

(*) Notice: Subject to any disclaimer, the term of this patent is extended or adjusted under 35 U.S.C. 154(b) by 0 days.

(21) Appl. No.: 10/280,157

(22) Filed: Oct. 25, 2002

(65) Prior Publication Data
US 2003/0079923 A1 May 1, 2003

Related U.S. Application Data
(60) Provisional application No. 60/336,352, filed on Oct. 26, 2001.

(51) Int. Cl.[7] .............................................. B62D 51/04
(52) U.S. Cl. ......................... 180/19.2; 5/510; 180/19.3
(58) Field of Search ....................... 180/16, 19.1, 19.2, 180/19.3, 11, 12, 904, 65.1, 65.5; 5/510

(56) References Cited

U.S. PATENT DOCUMENTS

| | | | | |
|---|---|---|---|---|
| 2,695,179 A | * | 11/1954 | Fancsali ..................... | 280/32.5 |
| 3,876,024 A | | 4/1975 | Shieman et al. | |
| 5,048,626 A | * | 9/1991 | Strehler et al. ............ | 180/19.2 |
| 5,322,306 A | * | 6/1994 | Coleman ................ | 280/33.992 |
| 5,439,069 A | * | 8/1995 | Beeler .......................... | 180/11 |
| 5,573,078 A | * | 11/1996 | Stringer et al. ............ | 180/19.2 |
| 5,580,207 A | * | 12/1996 | Kiebooms et al. .......... | 414/495 |
| 5,860,485 A | * | 1/1999 | Ebbenga ..................... | 180/19.2 |
| 5,947,490 A | * | 9/1999 | Munnoch et al. .......... | 280/32.7 |

FOREIGN PATENT DOCUMENTS

| | | |
|---|---|---|
| BE | 1012207 A6 | 7/2000 |
| NL | 1016924 | 6/2002 |
| WO | WO 01/85086 | 11/2001 |

OTHER PUBLICATIONS

Dane Industries Brochure "Productivity Solutions form the Industry Leader", (2001) (2pgs).
Dane Industries Product Brochure for QuiKART 1000 Power Pal (2001) (2pgs).
Dane Industries Product Brochure for QuicKART 2000 (2001) (2pgs).
Dane Industries Product Brochure for PowerPal 3000 (2001) (2pgs).
Dane Industries Product Brochure for QuicKART 5000 (2001) (2pgs).

* cited by examiner

Primary Examiner—Anne Marie Boehler
(74) Attorney, Agent, or Firm—Dorsey & Whitney LLP

(57) ABSTRACT

The present invention, in one embodiment, is a device for moving a hospital bed. The device comprises a body, a motor driven wheel coupled to the body, and a hitch coupled to the body and adapted for engaging the hospital bed. Finally, the present invention, in yet another embodiment, is a method for moving a hospital bed with a motorized device. The method comprises maneuvering the device into position next to the hospital bed, hitching the device to the hospital bed, and moving the hospital bed with the device.

42 Claims, 5 Drawing Sheets

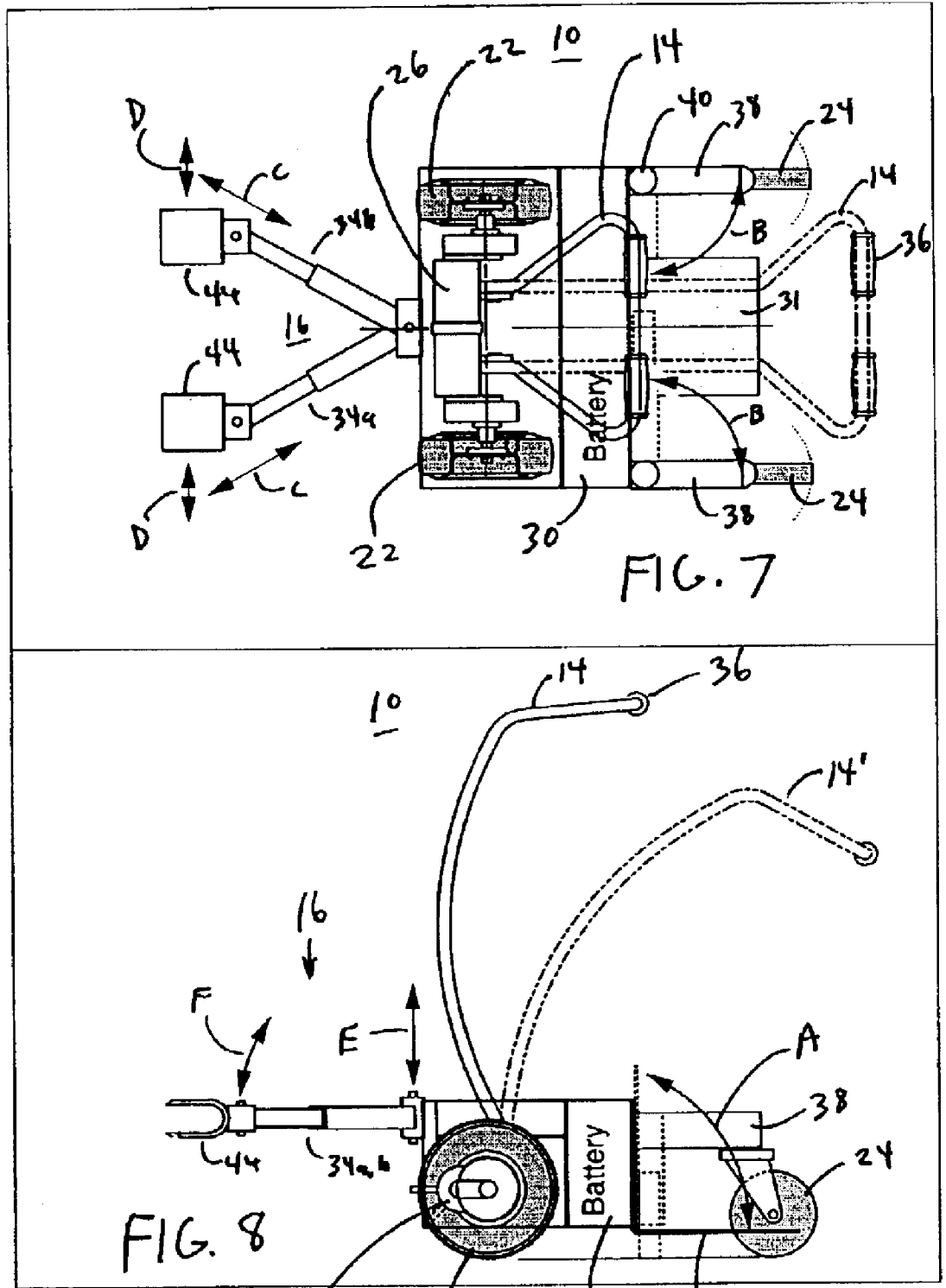

HOSPITAL BED POWER-ASSIST

The present application claims priority from a U.S. Provisional Application having Ser. No. 60/336,352, filed on Oct. 26, 2001, and entitled "Hospital Bed Power-Assist."

BACKGROUND OF THE INVENTION

The present invention relates to a power-assist device for transporting hospital beds. More specifically, the present invention is an electrically powered device adapted to assist a person in moving and steering a hospital bed.

Currently, most hospital beds, specialized treatment beds, and patient transfer beds (hereinafter, "hospital beds") are moved manually by people (the "mover"). Hospital beds are moved with regularity, because there is less physical effort required to move the entire bed than to lift the patient off the bed onto a gurney bed and then move the patient and gurney bed to another room, where they must again lift them back into a bed. Due to the weight of the typical hospital bed, the force required to move the bed through long corridors, up or down ramps, or over carpet requires force that exceeds a safe workload. As a result, a significant number of injuries occur to hospital bed movers each year. A typical hospital beds weighs between 400 and 2000 pounds, depending on the style of bed and the weight of the patient in the bed.

Under the current procedure for moving hospital beds, the mover pushes on the edge of the bed mattress or on handles that are located on the headboard or footboard of the bed, all of which are above waist height (approximately 4 feet above ground level). This pushing requires the mover to use the legs, hips, back, arms, and hands, any one of which is susceptible to injury from over exertion. These injuries cause lost work time and long-term health problems for the movers, and they cause added expenses to the hospitals. And lastly, the people that must move the beds are often nurses, and moving hospital beds contributes to the already high rate of nurse workplace injuries and is typically not a task the nurses enjoy.

There is a need in the art for an electrically powered hospital bed moving machine (hereinafter, "machine") to assist moving the hospital bed, which will work with the wide range of hospital beds in existence and eliminate most of the physical effort required to move and steer the bed safely. There is further need for a machine having a highly secure and adaptable hitching mechanism, which will allow a simple and fast connection. Finally, there is a need for the proper electrical controls and devices to control, efficiently power, and recharge the machine.

BRIEF SUMMARY OF THE INVENTION

The present invention, in one embodiment, is a device for moving a hospital bed. The device comprises a body, a motor driven wheel coupled to the body, and a hitch coupled to the body and adapted for engaging the hospital bed.

The present invention, in another embodiment, is method for moving a hospital bed by using a device having a body, a motor driven wheel coupled to the body, and a hitch coupled to the body and adapted for engaging the hospital bed.

Finally, the present invention, in yet another embodiment, is a method for moving a hospital bed with a motorized device. The method comprises maneuvering the device into position next to the hospital bed, hitching the device to the hospital bed, and moving the hospital bed with the device.

While multiple embodiments are disclosed, still other embodiments of the present invention will become apparent to those skilled in the art from the following detailed description. As will be apparent, the invention is capable of modifications in various obvious aspects, all without departing from the spirit and scope of the present invention. Accordingly, the drawings and detailed description are to be regarded as illustrative in nature and not restrictive.

BRIEF DESCRIPTION OF THE DRAWINGS

FIG. 7 is a top plan view of the power-assist machine with the cover removed according to one embodiment of the present invention having two drive wheels.

FIG. 8 is a side elevation view of the power-assist machine shown in FIG. 7 with the cover removed.

DETAILED DESCRIPTION

Figure 1:
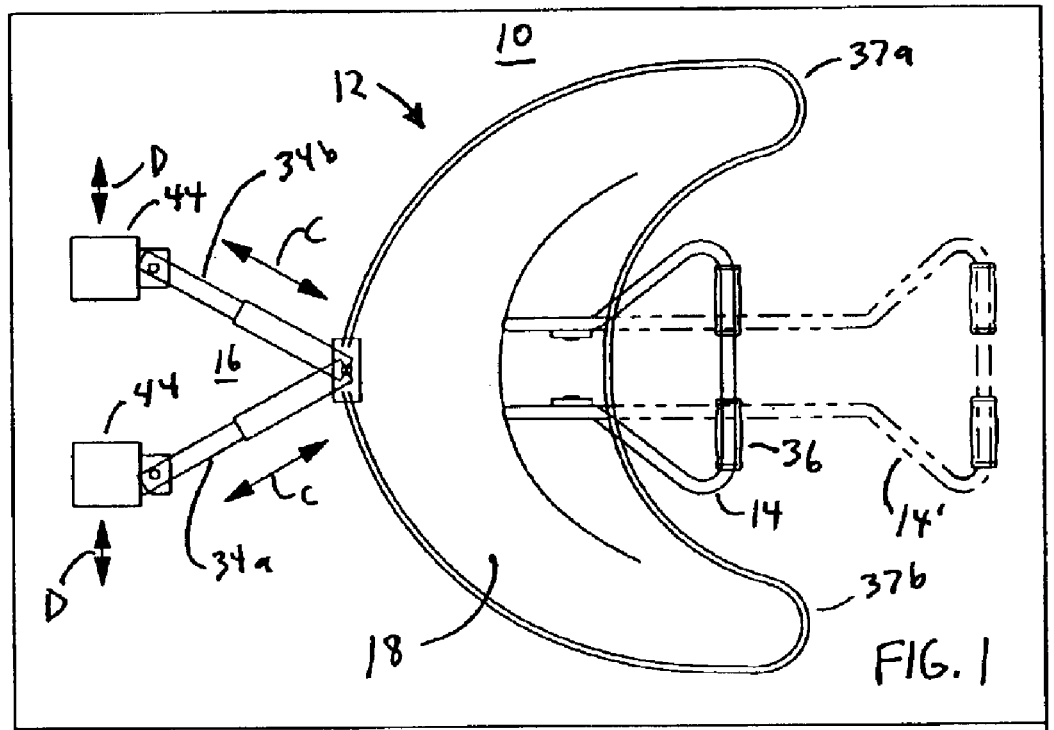
FIG. 1 is a top plan view of a power-assist machine according to one embodiment of the present invention.
Figure 2:
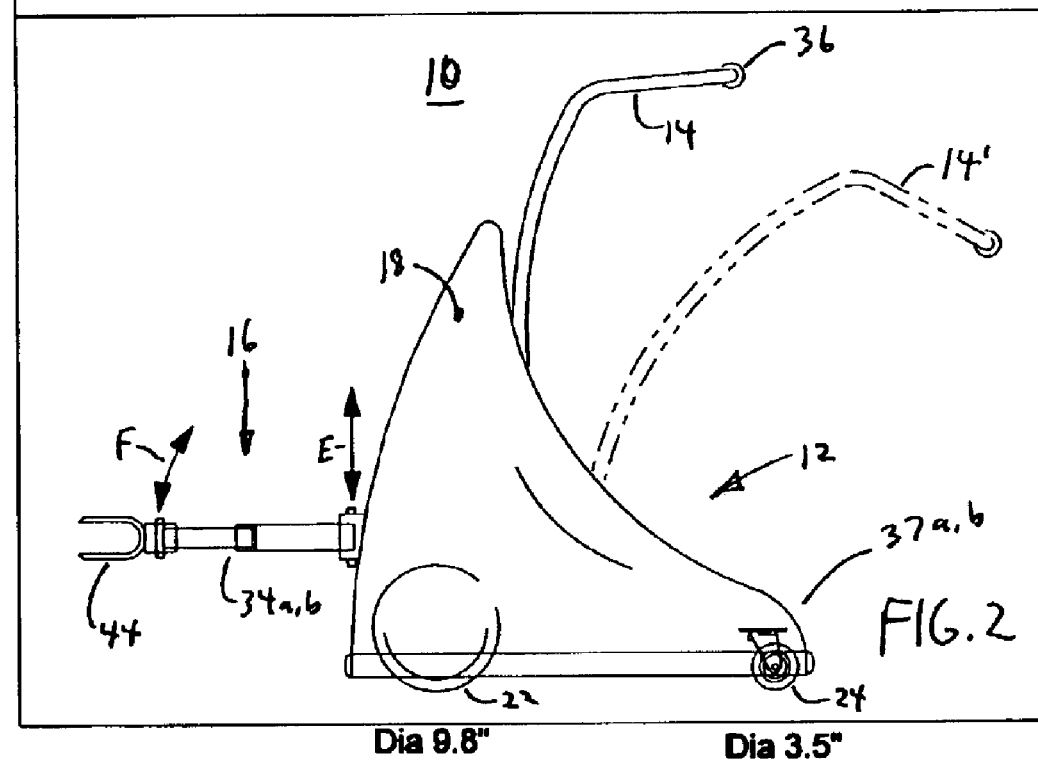
FIG. 2 is a side elevation view of the power-assist machine shown in FIG. 1.
Figure 3:
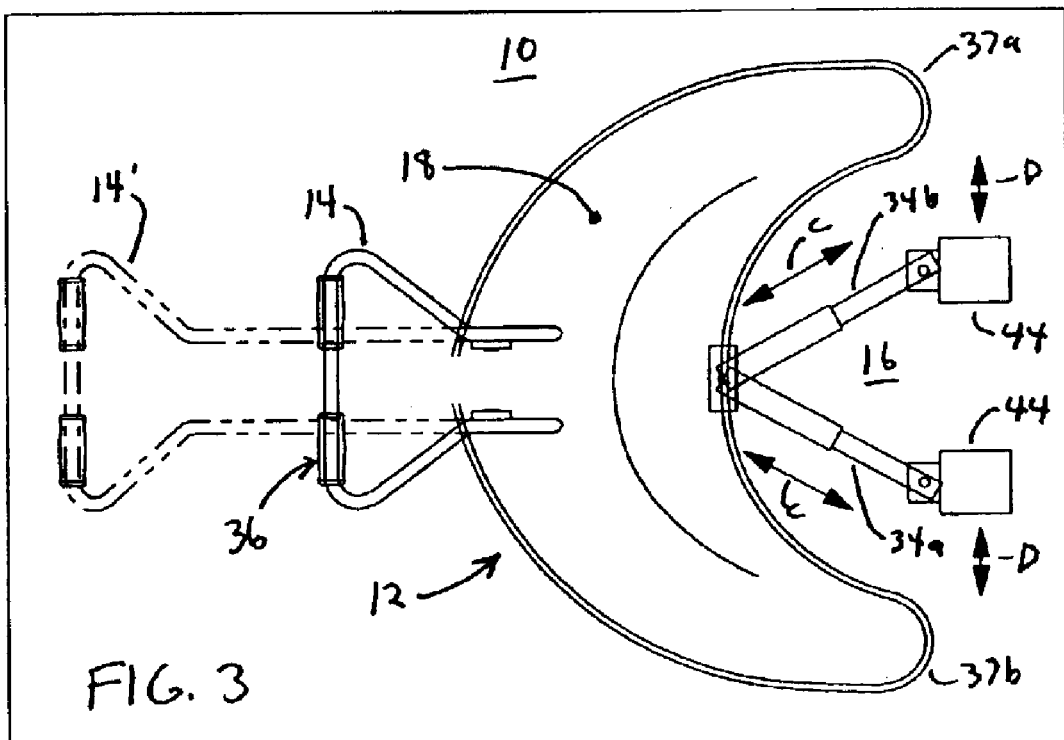
FIG. 3 is a top plan view of the power-assist machine according to another embodiment of the present invention.
Figure 4:
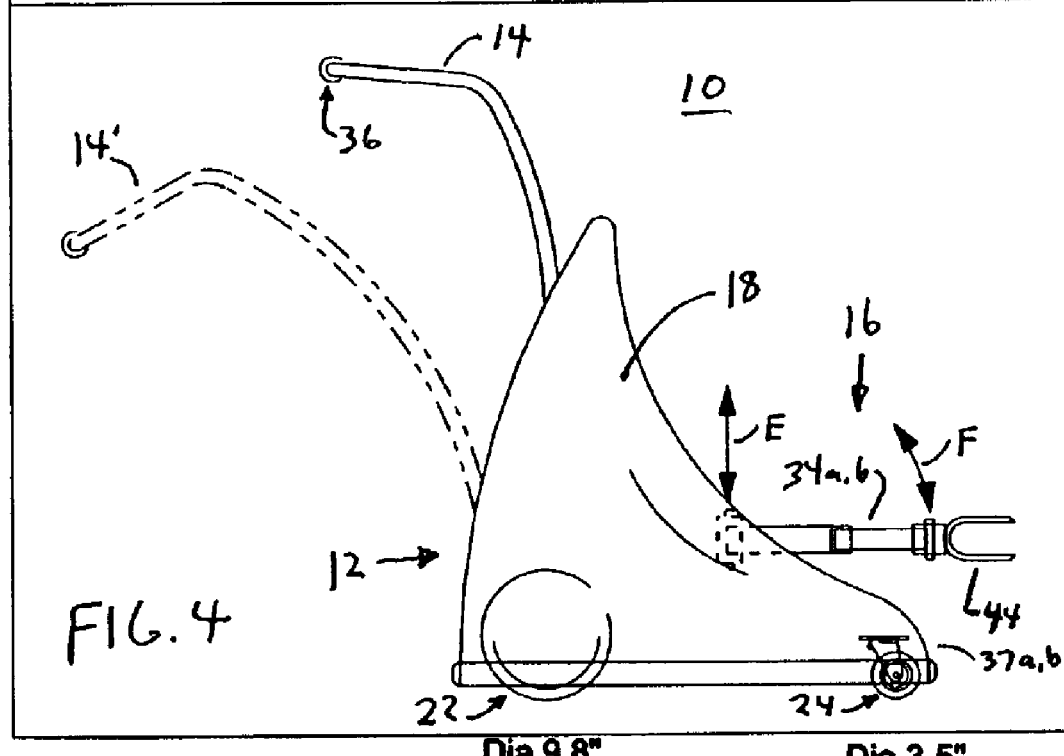
FIG. 4 is a side elevation view of the power-assist machine shown in FIG. 4.

FIG. 1 shows a top plan view, and FIG. 2 shows a side elevation view, of an electrically powered hospital bed moving machine 10 according to one embodiment of the present invention. Similarly, FIG. 3 shows a top plan view, and FIG. 4 shows a side elevation view, of the hospital bed moving machine 10 according to another embodiment of the present invention. As shown in FIGS. 1–4, the hospital bed moving machine 10 includes a body 12, a handle 14, and a hitch 16. The body 12 comprises a cover 18 and a structure 20. In one embodiment of the invention, the body 12 does not have a cover 18, but simply comprises a structure 20.

Figure 5:
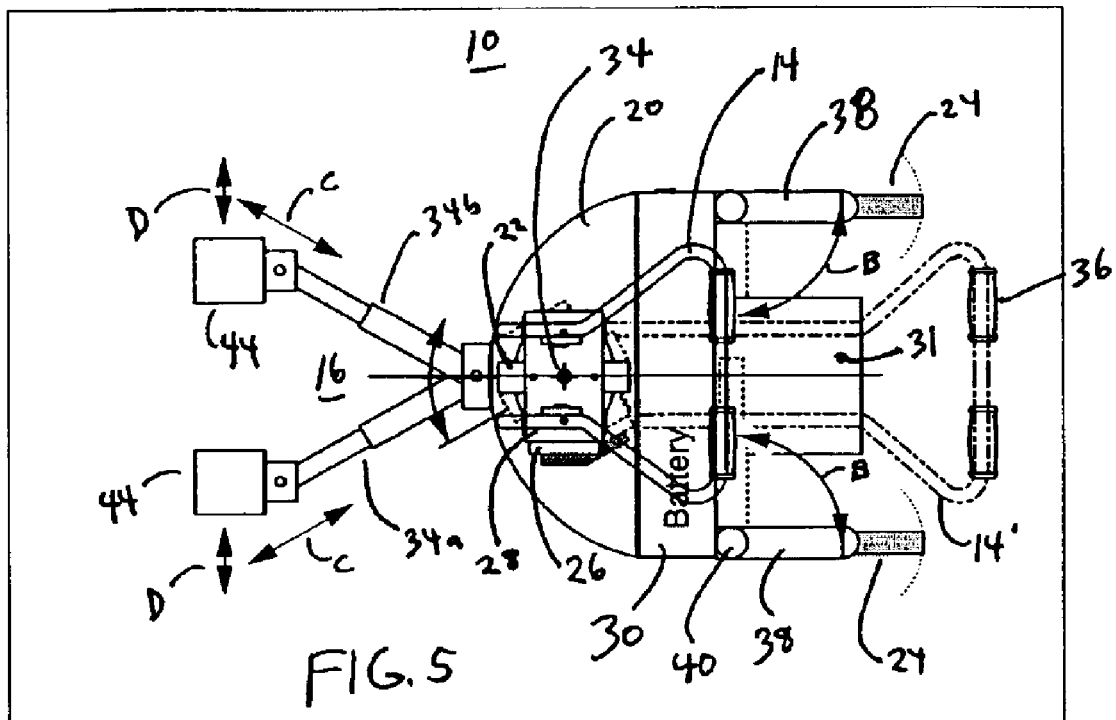
FIG. 5 is a top plan view of the power-assist machine with the cover removed.
Figure 6:
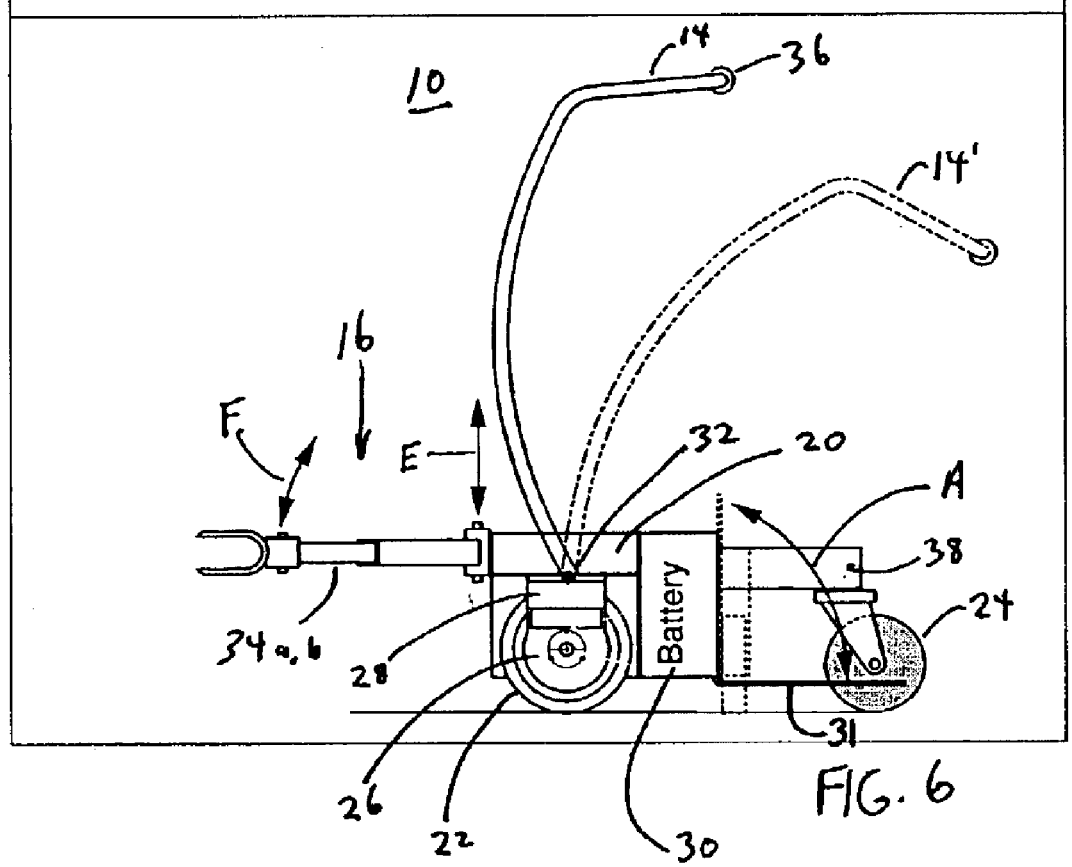
FIG. 6 is a side elevation view of the power-assist machine shown in FIG. 5 with the cover removed.

FIG. 5 shows a top plan view, and FIG. 6 shows a side elevation view, of one embodiment of the invention with the cover 18 removed. As shown in FIGS. 5 and 6, the cover 18 houses the structure 20, the drive wheel 22, the free turning wheels 24, the motor 26, the motor controls (i.e., drive circuitry) 28, and the power source 30.

As shown in FIGS. 1–6, the body 12 couples to the handle 14 and the hitch 16. As best shown in FIGS. 1 and 3, the body 12 has a wide stance and a low center of gravity to enhance the stability of the machine 10. This stability is important to allow the machine 10 to propel the hospital bed, which has a weight of up to 2000 pounds or more. The cover 18 of the body 12 acts to shield the operator or mover from internal components, and it provides a surface to display warnings or directions to the operator.

As shown in FIGS. 5 and 6, in one embodiment of the invention, the machine 10 has a standing platform 31 on which an operator may ride. The standing platform 31 further increases the ease by which an operator may move a hospital bed. The standing platform 31 also allows the operator's weight to be transferred to the drive wheel 22 of the machine 10, thereby increasing traction for the drive wheel 22 or wheels. The standing platform 31 may fold up or down as indicated by arrows "A" in FIG. 6.

The handle 14 is moveably coupled to the body 12, such that the handle 14 can rotate about a horizontal pivot 32 to a lowered position (shown as 14' in FIGS. 2, 4 and 6). In another embodiment, the handle 14 has a single position in that it does not rotate about a horizontal pivot 32. In one embodiment, the handle 14 is also coupled to the drive wheel 22 and the operator of the machine 10 can rotate the drive wheel 22 by rotating the handle 14 about a vertical pivot 34 (see FIG. 5), using a tiller control. In one embodiment of the present invention, user or mover controls 36 are placed near a distal end of the handle 14. In other embodiments of the invention, the controls 36 are located at other points on the handle 14 or machine 10. The controls 36 are adapted to be manipulated by the mover to control speed and direction of the machine 10, or any other necessary control parameter. In one embodiment of the present invention, the controls 36 are as available from Elektrosistem as distributed in the United States by AGV Products, Inc., 8012 Tower Point Dr., Charlotte, N.C. 28227.

Referring to FIGS. 5 and 6, in one embodiment, the power source 30 housed within the body 12 is one or more direct current batteries to provide electrical power to the electric motor 26. In another embodiment, the power source 30 further includes a battery charger to provide a method to re-energize the batteries. The battery charger may be on the machine 10 or at a recharge station. In one embodiment, the power source 30 includes a transformer and can receive alternating current from an external source through an electrical cord. The power source 30 powers the electric motor 26, which drives the drive wheel 22 or wheels to move the machine 10 and bed.

In one embodiment, the machine 10 includes a brake to limit motion of the machine 10 and bed, when not moving under the operator's control. In one embodiment, brake operation is activated when the electric motor is not in forward or reverse. The brake may be electrical or mechanical in nature. A separate control to release the brake may be provided. In one embodiment, the machine 10 includes a regenerative or dynamic braking feature to prevent the machine from overly accelerating as it travels down an incline. In one embodiment, the braking features are offered by controls 36 available through Elektrosistem as distributed in the United States by AGV Products, Inc., 8012 Tower Point Dr., Charlotte, N.C. 28227.

As discussed above, in one embodiment, the handle 14 has more than one operating position. The first position (shown as 14 in FIGS. 2, 4 and 6) is used when the operator is facing the machine 10. This position will most often be used when the machine 10 is attached to a bed and moving the bed. The handle 14 will be positioned close to the hitch 16 and bed and is designed to have the operator face the bed for good visibility of the bed and obstacles for clearance and for observation of the patient. In one embodiment, a second handle position (shown as 14' in FIGS. 2, 4 and 6) facilitates the machine in following the operator, although this second position can be used with the operator facing toward or away from the machine. The handle 14 will be positioned away from the hitch 16 and is designed for operator use with one hand while walking with his back to the machine 10. In this position, the machine 10 and bed (if attached) will follow the operator.

As previously noted, in one embodiment, the handle has a single position, the forward and backward motion of the machine 10 being controlled by controls 36 mounted on the distal end of the handle 14. In one embodiment of the invention, the handle 14 turns the drive wheel 22 via direct structural connection. In another embodiment, the handle 14 turns the drive wheel 22 via steering linkages or gears. In yet another embodiment, the handle 14 turns the drive wheel 22 via electrical controls connected to electromechanical devices.

As shown in FIGS. 5 and 6, in one embodiment, the present invention includes two free turning wheels 24 and one drive wheel 22. In this embodiment, the two free turning wheels 24 are located near the tips 37a, 37b of the body 12 (see FIGS. 1 and 3). The drive wheel 22 is located near the longitudinal centerline of the body 12, near the hitch 16. In one embodiment, the drive wheel 22 has a wide lateral dimension and is constructed from a soft, high-friction material, to maximize the frictional forces realized between the drive wheel 22 and the hospital floor. In one embodiment, the drive wheel 22, a gearbox, and the motor 26 form an integrated unit with the gearbox and the motor 26 being mounted on the hub of the drive wheel 22. The integrated unit of one embodiment of the invention is available from AGV Products, Inc., 8012 Tower Point Dr., Charlotte, N.C. 28227. In one embodiment, the motor 26 is separate from the drive wheel 22. Power is distributed from the motor 26 to the drive wheel 22 via mechanical means such as gears, shafts, belts and sheaves, or chains and sprockets.

As shown in FIG. 7, in another embodiment of the present invention, a second drive wheel is employed. In this embodiment, each drive wheel 22 may have its own motor 26 or the same motor 26 may power both drive wheels 22. Likewise, each drive wheel 22 may be commonly or independently controlled. In other embodiments, other wheel configurations are employed to further stabilize the machine and bear weight.

As shown in FIGS. 5 and 7, in one embodiment of the invention, the each free turning wheel 24 is mounted on a folding arm 38, which is attached to the structure 20 by a hinge 40. When the machine 10 enters an elevator or is stored in a confined space, the folding arms 38 may be folded in against the body 12 of the machine 10 as indicated by arrows "B" in FIGS. 5 and 7.

In one embodiment, the machine 10 includes an electric motor controller (i.e., drive circuitry) 28 for controlling the current provided to the electric motor 26 from the power source 30, based on the input from the operator controls 36. The motor controller 28 provides efficient control of the electric motor 26 to drive the drive wheel 22 in forward and reverse directions. In one embodiment, the motor controller 28 operates the electric motor 26 to allow a speed of between 0.5 and 3 miles per hour. The motor controller 28 may also provide the electrical braking features mentioned above, including regenerative or dynamic braking. In one embodiment of the present invention, the motor controller 28 is a model 1225/35 or 1227/37 motor controller as manufactured by Curtis Instruments, Inc., 200 Kisco Avenue, Mt. Kisco, N.Y. 10549.

As shown in FIGS. 1–6, the hitch 16, in one embodiment, comprises two telescoping arms 42a, 42b. Each telescoping arm 42a, 42b terminates in a securing device such as a clamp 44, as indicated in FIGS. 1–6. The hitch 16, via such securing devices as clamps 44, operates to engage the frame of the hospital bed, to connect the hospital bed moving machine 10 to the hospital bed without tools and with little physical effort. In one embodiment of the invention, the hitch 16 connects to the bed and transfers the bed's weight to the drive wheel 22 of the machine 10. This transfer of weight acts to increase the frictional force between the drive wheel 22 of the machine 10 and the hospital floor.

As shown in FIGS. 1, 3 and 5, the telescoping arms 42a, 42b of the hitch 16 may extend/retract and may converge/diverge as indicated by arrows "C" and "D," respectively. As shown in FIGS. 2, 4 and 6, the telescoping arms 42a, 42b may tilt up/down and may translate up/down as indicated by arrows "E" and "F," respectively. In one embodiment of the invention, the hitch 16 and the securing devices, such as clamps 44, are automated to facilitate and speed attachment. Electromechanical actuators, as are known in the art, cause the telescoping arms to move as described. In one embodiment of the invention, the hitch 16 and its telescoping arms 34a, 34b and securing devices are actuated automatically by the controls 36 on the handle 14.

Figure 9:
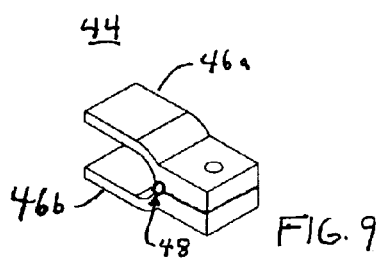
FIG. 9 is an embodiment of a securing device called a clamp.

One embodiment of a securing device is the clamp 44 illustrated in FIG. 9. A clamp 44 mechanically attaches to the end of each telescoping arm 42a, 42b as shown in FIGS. 1–6. Each clamp 44 has jaws 46a, 46b and a fulcrum 48. Electromechanical actuators cause the jaws 46a, 46b to pivot about the fulcrum 48 to clamp onto the hospital bed when the bed is to be transported and to release when the bed is disconnected from the machine 10 after the bed has arrived at its destination. While the clamp 44 is depicted in FIG. 9 as being configured to clamp on the horizontal structural member of a hospital bed, those skilled in the art will recognize that the clamp 44 can be configured to attach to a vertical structural member or a structural member of any other orientation.

Figure 10:
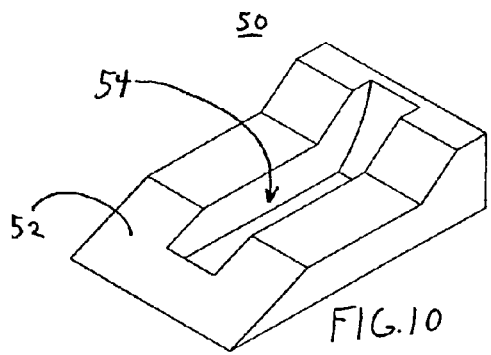
FIG. 10 is an embodiment of a securing device called a wheel lock.

One embodiment of a securing device is a wheel lock 50 as shown in FIG. 10. The wheel lock 50 comprises a block having a sloped approach 52 and a wheel groove 54. The wheel lock 50 mechanically attaches to the end of a telescoping arm 34a, 34b. The wheel locks 50 are placed in front of hospital bed wheels, which travel up the sloped approaches 52 and fall into the wheel grooves 54. The telescoping arms 34a, 34b then raise their respective wheel locks 50, the hospital bed wheels remaining nested within the wheel grooves 54 as the hospital bed is transported. To release the hospital bed, the wheel locks 50 are lowered back to the floor and the hospital bed wheels are rolled out of the wheel grooves 54 and down the sloped approaches 52 to the floor.

Figure 11:
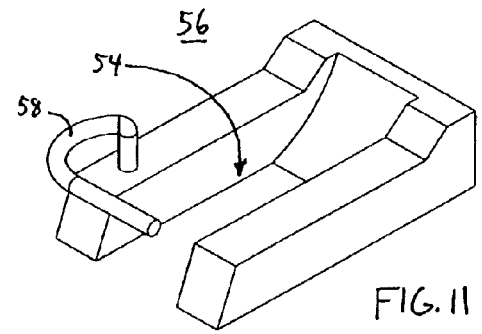
FIG. 11 is an embodiment of a securing device called a gated wheel lock.

One embodiment of a securing device is a gated wheel lock 56 as shown in FIG. 11. The gated wheel lock comprises a block having a wheel groove 54 and a gate retainer 58. The gated wheel lock 56 mechanically attaches to the end of a telescoping arm 34a, 34b. The gated wheel locks 56 are placed in front of hospital bed wheels, which travel into the wheel grooves 54. The gate retainers 58 are secured over the open end of the wheel grooves 54, trapping the hospital bed wheels in the wheel grooves 54. The telescoping arms 34a, 34b then raise their respective gated wheel locks 56, the hospital bed wheels remaining nested within the wheel grooves 54 as the hospital bed is transported. To release the hospital bed, the gated wheel locks 54 are lowered back to the floor. The gate retainers 58 are opened and the hospital bed wheels are rolled out of the wheel grooves 54.

Figure 12:
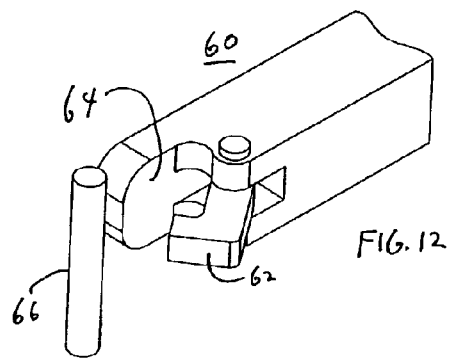
FIG. 12 is an embodiment of a securing device called a single-jaw clamp.

One embodiment of a securing device is a single-jaw clamp 60 as shown in FIG. 12. The single-jaw clamp 60 comprises a rotating jaw 62 and a back 64. The single-jaw clamp 60 mechanically attaches to the end of a telescoping arm 34a, 34b. The single-jaw clamp 60, with its rotating jaw 62 in the fully open position, is placed adjacent to a structural member 66 on the hospital bed. The structural member 66 is placed between the rotating jaw 62 and the back 64. Electromechanical actuators cause the rotating jaw 62 to close, securing the structural member 66 between the rotating jaw 62 and the back 64. The telescoping arms 34a, 34b then raise their respective single jaw clamps 60 to place the hospital bed in transport position. Once the hospital bed has been transported to its destination, the process is reversed to release the bed. While the single-jaw clamp 60 is depicted approaching a vertical structural member 66, those skilled in the art will recognize that the single-jaw clamp 60 can be configured to attach to a horizontal structural member or a structural member of any other orientation.

Figure 13:
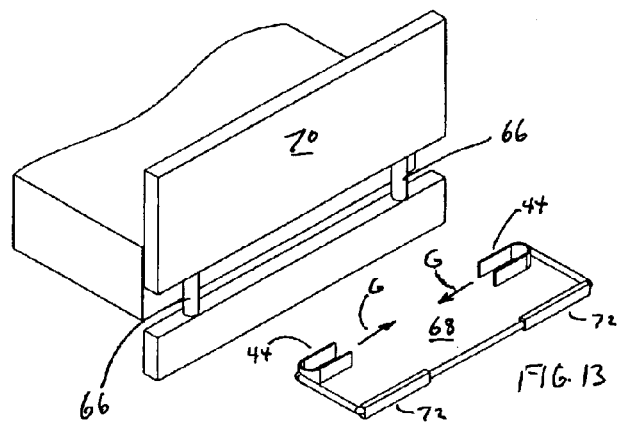
FIG. 13 is an embodiment of a securing device called a slide yoke.

One embodiment of a securing device is a slide yoke 68 as shown in FIG. 13. The slide yoke 68 utilizes opposing clamps 44 as illustrated in FIG. 9. The slide yoke 68 mechanically attaches to the end of the telescoping arms 34a, 34b. Once the clamps 44 of the slide yoke 68 are positioned so that the vertical structures 66 of a hospital bed 70 are between the opposing clamps 44, the slide yoke arms 72 converge the clamps 44 together (as indicated by arrows "G" in FIG. 13) until each structure 66 enters its respective clamp 44. Once the structures 66 are located within the confines of the clamps 44, the clamps close on the structures 66 and the telescoping arms 34a, 34b raise the hospital bed 70 for transport. Once the hospital bed 70 has been transported to its destination, the process is reversed to release the bed.

Alternate hitches 16 may be required for some beds. For example, the hitch 16 may be longer or shorter than depicted in the various Figures of this specification. Also, the hitch 16 may attach to the body 12 at locations other than those depicted in the Figures. Furthermore, the hitch 16 may be configured so that it does not have telescoping arms but is simply a groove or other type of hospital bed structure receiving device mounted on the body 12 of the machine 10 that allows the machine 10 to attach to a hospital bed for transportation. In other words, the hitch 16 may be any structure mounted on or that is part of the body 12 that allows the hospital bed to be attached to the machine 10 for transporting of the bed by the machine 10.

Figure 14:
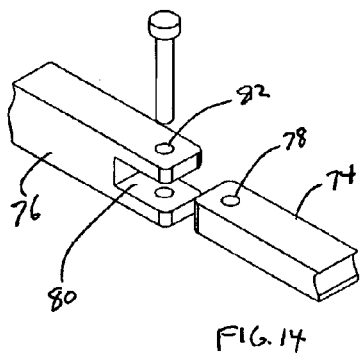
FIG. 14 is an embodiment of an attachment device having a tongue and a tongue-receiving element.

Also, some beds may require an attachment to allow connection of the hitch 16. An example of one embodiment of an attachment is shown in FIG. 14. FIG. 14 shows a tongue 74 and a tongue-receiving element 76. The tongue 74 has a first pin-receiving hole 78 and the tongue-receiving element 76 has a tongue receiving slot 80 and a second pin-receiving hole 82. The tongue 74 is placed within the tongue receiving slot 80 and the two pin holes 78, 82 are aligned. A pin 84 is placed within the aligned pinholes 78, 82, securing the tongue 74 to the tongue-receiving element 76. In one embodiment of the invention, the tongue 74 will be an attachment temporarily or permanently mounted on a hospital bed frame and the tongue-receiving element 76 will be secured to the end of the telescoping arms 34a, 34b of the hitch 16. In another embodiment of the invention, the tongue 74 will be located on the telescoping arms 34a, 34b of the hitch 16 and the tongue-receiving element 76 will be temporarily or permanently mounted on a hospital bed frame.

During operation of the machine 10, the operator uses the forward, reverse, and steering hand controls 36 on the handle 14 to activate the electric motor controller 28, electric motor 26, and drive wheel 22 or wheels to move the machine 10 into position from its at rest or storage position next to the hospital bed and close enough to allow hitching to the bed. The free turning wheels 24 provide support and balance for the machine 10 during this and all other operations. Next, the operator causes the hitch 16 to connect the machine 10 to the bed by manually moving the parts of the hitch 16 and latching them to the bed. In one embodiment, the operation of the hitch 16 may be electrically moved and latched and may be automated to ease and speed the attachment. In one embodiment, telescoping arms 34a, 34b extend forward until they contact the frame of the hospital bed. The arms 34a, 34b then spread out to position the securing devices, such as clamps 44, at equal distances from the center of hospital bed. The securing devices, such as clamps 44, then engage the frame of the hospital bed.

Next, the operator uses the forward, reverse, and steering hand controls 36 on the handle 14 to move the machine 10 and bed from its current location to a different location. During the moving of the machine 10 and bed, the handle 14 may be in the facing or following positions depending upon whether the operator is leading the machine and bed or whether the bed is leading the machine 10 and operator. During this move, the operator can turn the bed by turning the handle 14 about a vertical pivot point 34, which in turn causes the drive wheel 22 to turn.

Next, the operator causes unhitching to disconnect the machine 10 from the bed by manually moving the parts of the hitch 16 and unlatching them from the bed. In another embodiment, the hitch 16 is electrically moved and unlatched and may be automated to ease and speed the unhitching.

Although the present invention has been described with reference to preferred embodiments, persons skilled in the art will recognize that changes may be made in form and detail without departing from the spirit and scope of the invention.

I claim:

1. A device for assisting an operator in moving a hospital bed comprising:
    a body;
    a motor driven wheel pivotably coupled to the body, the driven wheel pivotable about a vertical axis;
    a handle pivotably coupled to the body and pivotable about said vertical axis, such that when the operator pivots the handle about the vertical axis, the driven wheel pivots about the vertical axis;
    a hitch coupled to the body and adapted for engaging the hospital bed; and
    a free turning wheel and a foldable arm having a first end pivotably coupled to the body and a second end coupled to the free turning wheel.

2. The device of claim 1 further comprising an electric motor coupled to the driven wheel for providing a driving force to the driven wheel.

3. The device of claim 2 wherein the handle is adapted to be rotated about a horizontal axis between a first position for forward movement and a second position for reverse movement of the electric motor.

4. The device of claim 2 further comprising a brake activated when the electric motor is not in forward or reverse.

5. The device of claim 2 further comprising an electric control for accepting inputs from the operator and activating and controlling the electric motor.

6. The device of claim 5 further comprising a battery coupled to the body for providing power to the electric motor when activated by the electric control.

7. The device of claim 1 further comprising a plurality of free turning wheels coupled to the body for providing stability to the body.

8. The device of claim 1 wherein the hitch includes at least one telescoping arm adapted to extend away from the body and engage a frame of the hospital bed.

9. The device of claim 8 wherein the hitch is automated.

10. The device of claim 9 wherein the automated hitch is electrically moved.

11. The device of claim 8 wherein the at least one telescoping arm may move horizontally.

12. The device of claim 1 wherein the hitch is adapted to transfer the weight of the hospital bed to the driven wheel.

13. The device of claim 1 further comprising a dynamic braking system.

14. A device for assisting an operator in moving a hospital bed comprising:
    a body;
    a motor driven wheel pivotably coupled to the body, the driven wheel pivotable about a vertical axis;
    a handle pivotably coupled to the body and pivotable about said vertical axis, such that when the operator pivots the handle about the vertical axis, the driven wheel pivots about the vertical axis;
    a hitch coupled to the body and adapted for engaging the hospital bed; and
    an operator platform coupled to the body.

15. The device of claim 14 wherein the platform is pivotably coupled to the body and adapted to fold into a stored position.

16. The device of claim 14 further comprising an electric motor coupled to the driven wheel for providing a driving force to the driven wheel.

17. The device of claim 16 wherein the handle is adapted to be rotated about a horizontal axis between a first position for forward movement and a second position for reverse movement of the electric motor.

18. The device of claim 16 further comprising a brake activated when the electric motor is not in forward or reverse.

19. The device of claim 16 further comprising an electric control for accepting inputs from the operator and activating and controlling the electric motor.

20. The device of claim 19 further comprising a battery coupled to the body for providing power to the electric motor when activated by the electric control.

21. The device of claim 14 further comprising a plurality of free turning wheels coupled to the body for providing stability to the body.

22. The device of claim 14 wherein the hitch includes at least one telescoping arm adapted to extend away from the body and engage a frame of the hospital bed.

23. The device of claim 22 wherein the hitch is automated.

24. The device of claim 23 wherein the automated hitch is electrically moved.

25. The device of claim 22 wherein the at least one telescoping arm may move horizontally.

26. The device of claim 14 wherein the hitch is adapted to transfer the weight of the hospital bed to the driven wheel.

27. The device of claim 14 further comprising a dynamic braking system.

28. A device for assisting an operator in moving a hospital bed, the device comprising:

a body;

a driven wheel pivotably coupled to the body, the driven wheel pivotable about a vertical axis;

a dynamic braking system coupled to the driven wheel;

an electric motor assembly mounted in a hub of the driven wheel, the assembly including an electric motor and a gearbox;

a handle pivotably coupled to the body and pivotable about said vertical axis, such that when the operator pivots the handle about the vertical axis, the driven wheel pivots about the vertical axis;

a hitch coupled to the body and adapted for engaging the hospital bed; and a free turning wheel and a foldable arm having a first end pivotably coupled to the body and a second end coupled to the free turning wheel.

29. The device of claim 28, wherein the hitch comprises a securing device adapted to engage a wheel of the hospital bed.

30. The device of claim 29, wherein the securing device is a gated wheel lock comprising a block having a groove adapted to receive the wheel and a gate retainer adapted to block the wheel's exit from the groove.

31. The device of claim 30, wherein the securing device is a wheel lock comprising a block having a sloped approach leading to a groove adapted to receive the wheel.

32. The device of claim 28, wherein the hitch comprises a securing device adapted to engage a portion of the frame of a hospital bed.

33. The device of claim 32, wherein the securing device is a clamp comprising first and second jaws pivotable towards each other about a fulcrum to clamp onto the portion of the frame.

34. The device of claim 32, wherein the securing device is a clamp comprising a fixed jaw and a pivoting jaw pivotable about a fulcrum towards the fixed jaw to clamp onto the portion of the frame.

35. A device for assisting an operator in moving a hospital bed, the device comprising:

a body;

a driven wheel pivotably coupled to the body, the driven wheel pivotable about a vertical axis;

a dynamic braking system coupled to the driven wheel;

an electric motor assembly mounted in a hub of the driven wheel, the assembly including an electric motor and a gearbox;

a handle pivotably coupled to the body and pivotable about said vertical axis, such that when the operator pivots the handle about the vertical axis, the driven wheel pivots about the vertical axis;

a hitch coupled to the body and adapted for engaging the hospital bed; and an operator platform coupled to the body.

36. The device of claim 35 wherein the platform is pivotably coupled to the body and adapted to fold into a stored position.

37. The device of claim 35, wherein the hitch comprises a securing device adapted to engage a wheel of the hospital bed.

38. The device of claim 37, wherein the securing device is a gated wheel lock comprising a block having a groove adapted to receive the wheel and a gate retainer adapted to block the wheel's exit from the groove.

39. The device of claim 38, wherein the securing device is a wheel lock comprising a block having a sloped approach leading to a groove adapted to receive the wheel.

40. The device of claim 35, wherein the hitch comprises a securing device adapted to engage a portion of the frame of a hospital bed.

41. The device of claim 40, wherein the securing device is a clamp comprising first and second jaws pivotable towards each other about a fulcrum to clamp onto the portion of the frame.

42. The device of claim 40, wherein the securing device is a clamp comprising a fixed jaw and a pivoting jaw pivotable about a fulcrum towards the fixed jaw to clamp onto the portion of the frame.

\* \* \* \* \*